US005198293A

United States Patent [19]

Metrick

[11] Patent Number: 5,198,293

[45] Date of Patent: Mar. 30, 1993

[54] NON-WOVEN CLEANING CLOTH

[75] Inventor: Dennis Metrick, Cumberland, R.I.

[73] Assignee: International Paper Company, Purchase, N.Y.

[21] Appl. No.: 560,477

[22] Filed: Jul. 27, 1990

Related U.S. Application Data

[63] Continuation of Ser. No. 184,991, Jun. 15, 1988, abandoned.

[51] Int. Cl.$^5$ .............................................. B32B 27/00

[52] U.S. Cl. ................................ 428/290; 15/104.93; 28/104; 428/299; 428/343; 428/348; 428/355

[58] Field of Search .................. 28/104; 428/290, 301, 428/343, 349, 355, 297, 299; 15/104.93

[56] References Cited

U.S. PATENT DOCUMENTS

| | | | |
|---|---|---|---|
| 3,016,555 | 1/1962 | Penover et al. | 15/209 |
| 3,208,093 | 9/1965 | Hansen | 15/506 |
| 3,537,945 | 11/1970 | Summers | 161/57 |
| 3,780,392 | 12/1973 | Lester | 15/104.93 |
| 4,510,640 | 4/1985 | Omori | 15/104 A |
| 4,630,603 | 12/1986 | Greenway | 428/343 |

*Primary Examiner*—James J. Bell

*Attorney, Agent, or Firm*—Ostrager, Chong & Flaherty

[57] ABSTRACT

A non-woven cleaning cloth preferably made by the hydro-entanglement process and impregnated with a pressure sensitive adhesive and a tackifier. This Abstract shall not be construed to limit the scope of the invention, as defined by the claims, or of the specification.

14 Claims, 2 Drawing Sheets

NON-WOVEN CLEANING CLOTH

BACKGROUND OF INVENTION

This is a continuation of co-pending application Ser. No. 07/184,991 filed on Jun. 15, 1988 is now abandoned.

FIELD OF THE INVENTION

Cleaning cloths impregnated with cleaning agents.

PRIOR ART

This invention relates to cleaning cloths of the non-woven type containing an adhesive which are effective to remove dust from a wide variety of surfaces. The cloth of this invention, for example, has been found to be highly effective in removing metallic particles produced by sanding automobile parts and body components in preparation for the painting of such parts and components.

Cleaning cloths of natural and synthetic fibers have been in use for many years. Without addition of cleaning agents, their use is limited to simple cleaning tasks, often as an adjunct to the use of cleaning liquids and sprays in household use.

Non-woven cloths are particularly useful as cleaning cloths. In particular, non-woven cloths made by the hydro-entanglement process (HEP) are highly effective for this use. The HEP is well-described in U.S. Pat. No. 3,537,945. Essentially, HEP involves treating a web of fibers with jets of high pressure water or other liquid which serves to "entangle" the fibers, i.e., to force the fibers from a position of alignment into one where the fibers individually are at various angles with respect to each other and become physically entangled to produce a hydro-entangled fabric (HEF). The HEF is exceptionally strong and soft, and it also contains voids which occur between the physical junctions of the fibers which are highly effective in assisting the pick-up and retention of dust and particles. Moreover, the HEP can be adjusted to produce an HEF which has visible apertures which also enhance dust and particle pick-up and retention.

The present invention employs an HEF which is preferably—but not necessarily—of the apertures type, and which is preferably—but not necessarily—made of natural fibers, preferably from cellulosic fibers or other fibers. Further, the process of this invention involves impregnating the HEF with a pressure-sensitive adhesive (PSA) and a tackifier (T) while the HEF is still wet from the HEP so that the PSA and T migrate completely throughout the HEF, as opposed to simply being applied on and remaining on the surface of the cloth.

Although the cleaning cloth art is highly developed, there are only a few patents which bear even remotely on the novel process and product of the present invention.

U.S. Pat. No. 3,780,392 is directed to a dust cloth with a bio-active ingredient intended primarily for use in hospital and other places where bacteria, etc., are present and must be removed. In this patent, it is stated that the "tackifier is a pressure-sensitive adhesive"—which reflects the occasional confusion in the art between adhesives and tackifiers. More properly, adhesives, including PSAs, are one class of compounds and tackifiers are another class of compounds used to enhance the effectiveness of the adhesive. In the case of the present invention, the T increases the coefficient of friction and increases the ability of the PSA to attract and retain dust and particles, especially metallic particles.

Thus, the '392 patent does not have a tackifier separate from a PSA. The PSA disclosed in a "vinyl (sic) acetate copolymerized with a high molecular acrylic. A specific example of such a tackifier is 2-ethyl hexyl acrylate."

The '392 patent does not anticipate the use of a wet cloth (such as in the present invention) and thus requires surfactants and defoamers to wet the cloth which permits the cloth to take an even coating. The patent thus refers to a dry cloth (such as not in the case in the present invention) whereas there is no requirement for either a surfactant or defoamer. Further, the '392 patent requires the use of a lubricant to prevent the PSA disclosed therein to adhere to just the surface of the cloth.

By contrast, the present invention, as indicated, involves applying the PSA and T to the HEF while wet, so that the PSA and T can thoroughly impregnate the HEF. While the advantage of thorough impregnation—versus simply applying a PSA on the surface as per prior art efforts—is not readily apparent, it produces unexpected and surprising results.

First, applying a PSA just to the surface of a cleaning cloth renders it so sticky that it cannot be easily moved over the surface to be cleaned.

Second, prior cloths of this type typically are stiff, have poor hand and poor particle retention. Some even smear the surface to be cleaned.

Third, the present invention has a good hand, is soft and has excellent particle pick-up and does not leave chemical residue, nor does it stick to the surface to be cleaned. The present invention is very effective in picking up dust and metal particles and retaining them. This pick-up of dust and metal particles is achieved while the present invention is functioning as a cloth that can be passed smoothly and quickly across a wide variety of surfaces, including metal surfaces. Precisely why this is so is not fully understood. However, as indicated, it is believed that the use of a T greatly enhances the particle pick-up capability of the PSA and, further, that the thorough impregnation of the PSA and the T greatly enhances particle retention. Probably, this occurs because the fibers in the HEF are coated with the PSA/T and thus are better able to cause the particles to remain in the voids by adhesives forces, as well as by being purely mechanically trapped.

The concept of impregnating rags—as opposed to non-woven cloths—appears in U.S. Pat. 3,016,555 which discloses yet another chemical system involving a certain class of polyester resins dissolved in a plasticizer, the combination of which is referred to as a "tackifier". This disclosure is distinct from the present invention because it does not involve HEP, an HEF and does not have a PSA and a T.

Another older disclosure involving impregnating cloths which are not disclosed to be non-woven is found in U.S. Pat. No. 3,208,093 which discloses a complicated combination of plastic resins "conditioned by suitable plasticizers and other modifiers". Again, the present invention is fully effective without the use of plasticizers or "modifiers" as disclosed in the '093 patent.

Finally, U.S. Pat. No. 4,510,640 does disclose—in one example—the use of non-woven material, although not the use of an HEF. The patent, insofar as it can be understood, suggests coating one face of the "pocket" shown therein. Among other distinctions, the '640 patent does not disclose impregnating an HEF or the use of a T in addition to a PSA.

THE DRAWINGS

DETAILED DESCRIPTION

Figure 1:
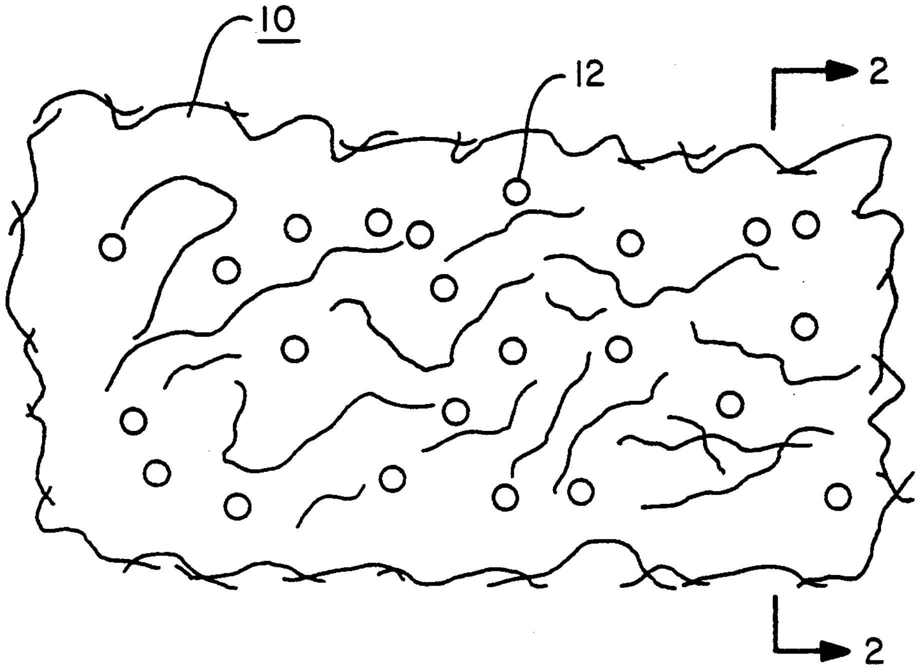
FIG. 1 is a side elevation of a preferred cleaning cloth of this invention.

FIG. 1 shows generally one preferred embodiment of the invention comprising an HEF cloth 10 with visible apertures 12.

Figure 2:
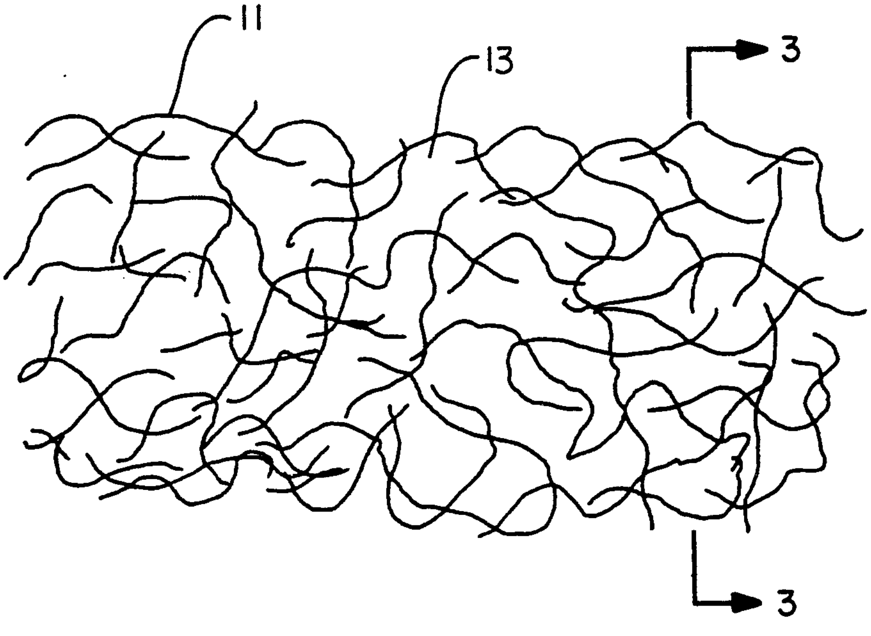
FIG. 2 is a view in section, taken along lines 2—2 of FIG. 1, illustrating in schematic form the internal structure of the cloth of FIG. 1.

FIG. 2 is a sectional view and illustrates the high degree of entanglement of the fibers 11—preferably cellulosic—that actually form the HEF and the voids 13 formed throughout the cloth.

Figure 3:
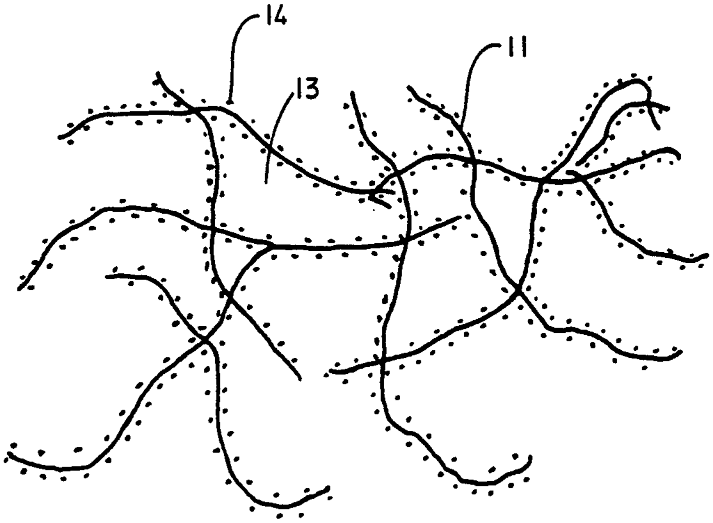
FIG. 3 is an enlarged view, taken along lines 3—3 of FIG. 2, illustrating in detail the entangled fibers and the adherence thereto of the PSA and T of the present invention.

FIG. 3 is an enlarged sectional view of the entangled fibers 11 and voids 13. This Figure also shows that, throughout the cloth, the fibers 11 are impregnated with PSA and T, the impregnating substances being designated by reference numeral 14.

The tremendous advantage of the present system over the prior art is, as indicated in the Background, that the PSA's ability to pick-up and retain dust and particles is enhanced by a T and, furthermore, rather than being applied just to the surface of the cloth 10, they are impregnated throughout the fabric 10. The resulting fabric is non-sticky to the touch, has good hand, is soft and has a tremendous ability to pick up and retain dust and particles. In one particular application, namely, in the finishing of automotive parts, including body parts, the standard procedure is to sand the metal prior to painting. However, the sanding leaves a layer of metallic dust that must be completely removed before painting can begin. This is accomplished by the use of cleaning cloths and it is imperative that the cloths be inexpensive, be easily and smoothly slidable across the surface of the part, yet completely effective in picking up and retaining the metal particles. The cloths of the present invention accomplishes this important task most effectively, with better cleaning performance and lower cost than cloths currently or previously used.

The following fibers can be used alone or in blends: cellulose, rayon, cotton, PET, polypropylene, polyethylene, nylon, acrylic, and aramids. Aramid fibers suitable for use in the invention cleaning cloth are marketed under the brand designations KEVLAR and NOMEX, by E. I. Du Pont de Nemours and Company, Wilmington, Del. It is preferred that the cloth contain rayon to assist in the application set of the PSA and T.

Again, while the precise mechanism is not entirely understood, it is believed this superior and unexpected performance results from a combination of factors, especially the use of HEF, impregnating the HEF while it is wet to ensure the PSA and T completely penetrate the HEF and the use of the T as well as the PSA.

The preferred PSA in this invention is a polyvinyl ester copolymer made by National Starch and Chemical Corporation (NSC) under the code 5540-81A, in which the ester copolymer is mixed with water at a ratio of 56:44. While the exact chemical structure is not known to the Inventor, certain of its properties are: boiling point 212° F., melting point 32° F., and 100% soluble in water. NSC sells similar grades having somewhat different physical properties, including that given NSC code 78-6564.

It is to be noted that, as represented by the above NSC PSA, it is highly desirable to use a water-based PSA to avoid the difficulties encountered with solvent-based adhesives, including flamability and environmental problems.

A preferred tackifier (T) for use in conjunction with the PSA is that made by Hercules Incorporated (HI) and designated by HI as AP25-55WKX and described as an akylaryl aromatic hydrocarbon resin combined with an anionic emulsifier. Other HI Ts which have been found to be useful in connection with the present invention are: (1) Foral 85-55WKX, a glycerol ester of highly hydrogenated resin, also combined with an anionic emulsifier and; (2) Piccotex LC-55WK, an aromatic copolymer combined with an anionic resin soap.

The preferred PSA and T described above yield a preferred coefficient of friction (COF) of 1.331, which is within an ideal range of about 0.9 to about 1.5 for the COF. That is, in lay terms, the surface of the cloth is neither too "sticky" or too "slippery". The COF is measured by ASTM D 1874-75 as modified for nonwovens.

Figure 4:
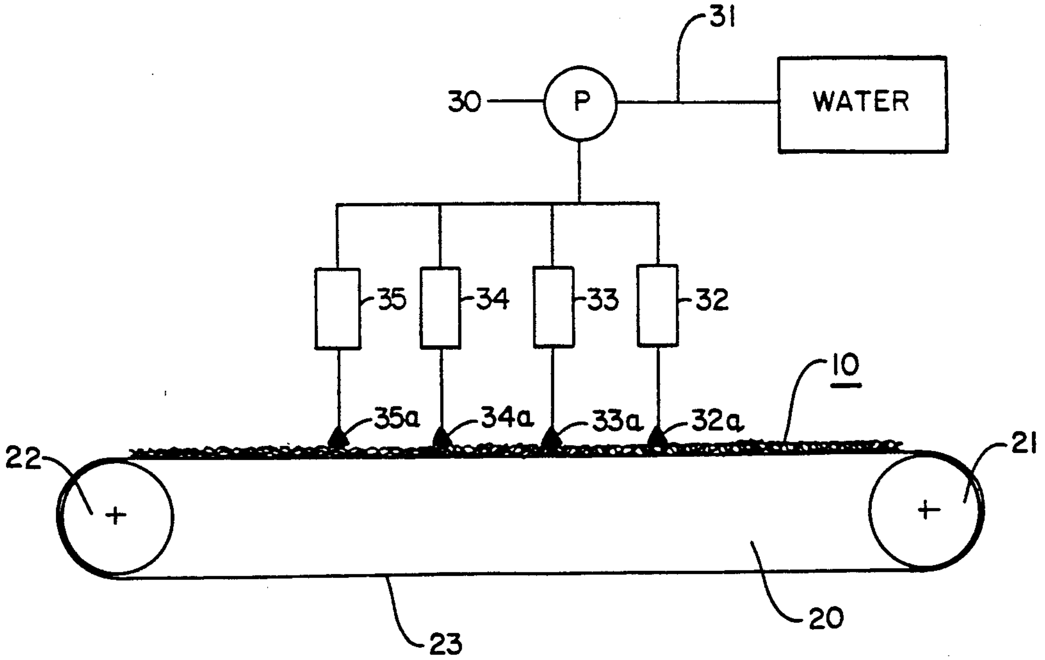
FIG. 4 is a schematic view of the apparatus for forming the cleaning cloth of this invention.

The apparatus and process for manufacturing the cleaning cloth of this invention is schematically illustrated in FIG. 4 wherein a set of rollers 21, 22 support a conveyor belt 23. The fibers 10 are laid down on the belt 23 by conventional means and are subject to jets or colmunar streams or high-pressure water to create the hydro-entanglement. The water pipe 31 supplies water to a high pressure pump 30 which forces the water under high pressure to filters 32-35 and then through pipes to distribution jets **32*a*-35*a*** which may be in the form of manifolds.

The entangled web, while it is still wet, is thoroughly impregnated with the PSA and T to create the unique cleaning cloth schematically illustrated in FIGS. 1-3.

To impregnate the entangled web with PSA and T, it is preferred to do so by passing HEF 10 through a metered application which controls the amount applied and surface applied to. The applications of PSA and T are not limited to gravure, spray, or screen coaters. The wet HEF assists in wicking the PSA and T throughout the entire cloth. This method produces a cloth with a controlled amount of PSA and T that is not stiff.

FIG. 4 is illustrative of the entanglement process, but other variations are possible.

The following is an example of the preferred embodiment and should not be construed as to limit the invention to the example.

EXAMPLE

An embodiment of the invention was made by hydroentangling a 50 gsy web of 75% rayon and 25% PET. The web first being prepared by conventional carding equipment. 50% of the web was fed to an air laid randomizing machine. These combined webs were then hydroentangled at 75 fpm and 1.0 hp-hr/lbs. This combined web was then passed through a gravure printing station where a solution of the PSA and T were applied to one surface of the web. The solution was made of 75.5% water, 18.7% National starch 78-6564 and 5.8% Hercules AP-25-55WKX. A finished fabric had a weight of 55 gsy, md grab tensile 25 lbs, cd grab tensile of 13, and a coefficient of friction of 1.44. The fabric was not stiff, slipped easily across surfaces to be cleaned, and picked up and retained dust particles from these surfaces.

What is claimed is:

1. A non-woven cleaning cloth comprising an array of hydroentangled fibers and means for adhering dust and particles to said array, wherein said entangled fibers are completely impregnated by said adhering means, said adhering means comprising a pressure sensitive adhesive and a tackifier.

2. The cleaning cloth as defined in claim 1, wherein the surface of said cloth has a coefficient of friction in the range of 0.9 to 1.5.

3. The cleaning cloth as defined in claim 1, wherein said pressure sensitive adhesive comprises polyvinyl ester copolymer.

4. The cleaning cloth as defined in claim 1, wherein said tackifier comprises glycerol ester of highly hydrogenated resin.

5. The cleaning cloth as defined in claim 1, wherein said tackifier comprises akylaryl aromatic hydrocarbon resin.

6. The cleaning cloth as defined in claim 1, wherein said tackifier comprises aromatic copolymer.

7. The cleaning cloth as defined in claim 1, wherein the material of said fibers is selected from the group consisting of cellulose, rayon, cotton, polyester, polypropylene, polyethylene, nylon, acrylic and aramids.

8. A method of fabricating a non-woven cleaning cloth, comprising the steps of:

providing a web of hydroentangled fibers in a wet state;

adding to said web in said wet state a metered quantity of a pressure sensitive adhesive and a tackifier, which substances have the property of causing dust and particles to adhere to said fibers when said web is in a dry state.

9. The method as defined in claim 8, wherein said pressure sensitive adhesive is polyvinyl ester copolymer.

10. The method as defined in claim 9, wherein said tackifier comprises glycerol ester of highly hydrogenated resin.

11. The method as defined in claim 9, wherein said tackifier comprises akylaryl aromatic hydrocarbon resin.

12. The method as defined in claim 9, wherein said tackifier comprises aromatic copolymer.

13. The method as defined in claim 8, wherein the material of said fibers is selected from the group consisting of cellulose, rayon, cotton, polyester, polypropylene, polyethylene, nylon, acrylic and aramids.

14. The method as defined in claim 8, wherein said metered quantity is such that the surface of said cloth has a coefficient of friction in the range of 0.9 to 1.5.

* * * * *